(12) United States Patent
Andersen

(10) Patent No.: US 10,869,463 B2
(45) Date of Patent: Dec. 22, 2020

(54) METHOD FOR SEPARABLE CONNECTION AND FIXATION OF TWO CIRCULAR CYLINDRICAL PIPE ENDS, SYSTEM FOR CONNECTION OF TWO PIPE ENDS WITH THE SAME EXTERNAL DIAMETERS AND THE SAME MATERIAL THICKNESS AND USE OF SUCH A SYSTEM

(71) Applicant: Landmeco Olgod A/S, Olgod (DK)

(72) Inventor: Karsten Egelund Andersen, Olgod (DK)

(73) Assignee: LANDMECO OLGOD A/S

( * ) Notice: Subject to any disclaimer, the term of this patent is extended or adjusted under 35 U.S.C. 154(b) by 437 days.

(21) Appl. No.: 15/742,857

(22) PCT Filed: Jun. 16, 2016

(86) PCT No.: PCT/DK2016/050189
§ 371 (c)(1),
(2) Date: Jan. 8, 2018

(87) PCT Pub. No.: WO2017/059861
PCT Pub. Date: Apr. 13, 2017

(65) Prior Publication Data
US 2018/0368372 A1 Dec. 27, 2018

(30) Foreign Application Priority Data

Jul. 10, 2015 (DK) .................................. 2015 70459
Nov. 12, 2015 (DK) .................................. 2015 70734

(51) Int. Cl.
*F16L 37/098* (2006.01)
*A01K 39/012* (2006.01)
(Continued)

(52) U.S. Cl.
CPC ........ *A01K 39/0125* (2013.01); *A01K 5/0258* (2013.01); *F16L 21/002* (2013.01);
(Continued)

(58) Field of Classification Search
CPC .... A01K 5/0258; F16L 21/08; F16L 37/0985; F16L 37/098; F16L 21/00
See application file for complete search history.

(56) References Cited

U.S. PATENT DOCUMENTS 3,799,116 A * 3/1974 Hostetler ............. A01K 5/0258
119/57.4
4,089,300 A * 5/1978 Keen .................... A01K 5/0258
119/57.4
(Continued)

FOREIGN PATENT DOCUMENTS

DE 287317 1/1914
DE 4010234 10/1991
(Continued)

*Primary Examiner* — David Bochna
(74) *Attorney, Agent, or Firm* — Ware, Fressola, Maguire & Barber LLP

(57) ABSTRACT

A method for the separable joining and fastening of two circularly cylindrical pipe ends (2, 2A) with the same outside and inside diameters, in mutual non-rotatable extension of each other with coinciding central axes (3) is provided in which the pipe ends (2, 2A) are brought axially against each other and fastened radially, wherein a toothing (7) in the axial direction at one pipe end (2) engages with a corresponding toothing (7) in the axial direction at the other pipe end (2A) in a last section of the axial assembly for joining two pipe ends. Similarly, a system is provided with a joint sleeve and corresponding detent for keeping the pipe ends joined.

6 Claims, 8 Drawing Sheets

(51) Int. Cl.
*A01K 5/02* (2006.01)
*F16L 21/00* (2006.01)
*F16L 25/14* (2006.01)

(52) U.S. Cl.
CPC .......... *F16L 21/005* (2013.01); *F16L 37/098* (2013.01); *F16L 37/0985* (2013.01); *F16L 25/14* (2013.01)

(56) References Cited

U.S. PATENT DOCUMENTS

| | | | | |
|---|---|---|---|---|
| 5,513,597 A | * | 5/1996 | Pollock | A01K 5/0258 |
| | | | | 119/57.4 |
| 5,868,443 A | * | 2/1999 | Ungerman | F16L 37/148 |
| | | | | 285/305 |
| 2014/0261199 A1 | * | 9/2014 | Rose | A01K 5/0258 |
| | | | | 119/53 |

FOREIGN PATENT DOCUMENTS

| | | | | |
|---|---|---|---|---|
| EP | 2792235 | | 10/2014 | |
| FR | 3062702 A1 | * | 8/2018 | ............. F16L 21/08 |
| GB | 1201854 | | 9/1965 | |
| SE | 1100729 | | 4/2013 | |

\* cited by examiner

METHOD FOR SEPARABLE CONNECTION AND FIXATION OF TWO CIRCULAR CYLINDRICAL PIPE ENDS, SYSTEM FOR CONNECTION OF TWO PIPE ENDS WITH THE SAME EXTERNAL DIAMETERS AND THE SAME MATERIAL THICKNESS AND USE OF SUCH A SYSTEM

CROSS-REFERENCE TO RELATED APPLICATIONS

This application is a U.S. national stage of International Appl. No. PCT/DK2016/050189 filed 16 Jun. 2016, which claimed priority to Danish Appl. Nos. PA 2015 70459 filed 10 Jul. 2015 and PA 2015 70734 filed 12 Nov. 2015, which applications are all incorporated herein by reference in their entireties.

TECHNICAL FIELD

The invention relates to a method for the separable joining and fastening of two circularly cylindrical pipe ends with the same outside and inside diameters in a mutually non-rotatable extension of each other with coinciding central axes.

BACKGROUND

Methods of this kind typically involve inserting a pipe end into a projecting end section of an adjacent pipe end, where a clip or the like is then fitted to protect from the pressure of the projecting part against the pipe end inserted therein and hence prevent the pipe ends from being pulled free of each other.

The use of clips and the like, with either a great many moving parts or with threaded parts, for example, presents the risk of hidden cavities and places where materials can be deposited and give rise to the propagation of bacteria. At the same time the use of tools is often necessary and incorrect fitting is easily possible. Using this technology there are also substantial metal-to-metal contact surfaces, and moisture can accumulate here which in turn creates conditions for corrosion of the metal parts and consequent weakening of the structure, as well as poorly operating moving parts.

A pipe joint is known from DE 4010 234 A1 comprising a joint sleeve into which pipe ends can be inserted from two opposite ends and secured here by means of sprung detents.

A method is known from GB 1 201 854 for joining pipes with a projection at one pipe end, which accommodates a pipe section. The same patent also discloses the use of a sprung detent which on the one hand prevents the separation of the two pipes and on the other protects the pipes against rotation relative to each other.

A joining method is known from SE 1100729 for pipe ends where the pipe ends are first brought into contact with each other and where a flexible sleeve is then bent over the joint. A method is known from the patent for preventing the pipes from rotating relative to each other in the case of toothing of the pipe ends abutting each other.

U.S. Pat. No. 5,868,443 discloses a method for separable joining and fastening of two circularly cylindrical pipe ends with the same outside and inside diameters in a mutually non-rotatable extension of each other with coinciding central axes, wherein the pipe ends are inserted axially into a common joint sleeve from each end of the joint sleeve, thus establishing an engagement with the outer surfaces of the pipe ends and the joint sleeve along the circumference of the pipe ends, wherein a toothing in the axial direction at one pipe end engages with a corresponding toothing in the axial direction at the other pipe end in the last part of the axial insertion for joining two pipe ends in the joint sleeve.

SUMMARY OF THE INVENTION

The object of the invention is to provide a system for joining pipe ends so that the radial forces, bending moments and forces in the longitudinal direction can be absorbed in the joint, and also to provide the possibility of constructing the joint so that cavities and cracks that are difficult to reach are completely avoided, thus ensuring that the pipes are effectively protected against mutual rotation between the joined pipes.

The joints of prior art of this type has, as stated, various drawbacks, for example an increased risk of corrosion, no possibility of visual inspection to ensure that the joint has been correctly carried out, the need to use tools for establishing the joint and more importantly: absence of straightness in the joint, which means that consecutive pipes do not have exactly the same central axis.

In the system according to the invention a secure, stable joint is established which does not suffer from these drawbacks and is extremely easy to establish. At the same time it is ensured that the torque around the central axis for the two pipe ends can be transmitted without affecting the joint sleeve. This makes the invention particularly useful for tasks where high torques are to be transmitted from pipe end to pipe end and, what is more, without negatively influencing the function of the pipe ends as material-carrying pipes. If, in particular, the pipe joint is used for joining transfer lines, where a helical screw is formed inside the pipes for feeding granular material as the screw rotates in the pipe, the joint can help ensure that the screw inside the pipe does not transfer its rotation to the pipe.

As stated, the radial angular section of one of the pipe ends retracted in the axial direction is longer in the axial direction than the retracted angular section of the other pipe end. This means that when the two pipe ends are joined in the joint sleeve at least one gap is formed in which the pipes are not in contact with each other. This gap or these gaps are completely or partially filed by a protrusion inside the joint sleeve when the pipe ends are joined inside it, the protrusion having the same inside diameter as the inside diameter of the two pipe ends. When a pipe end according to the system is to be fitted in the sleeve, this is only possible when the protrusions therein are rotated to the correct angular position relative to the pipe. At the same time a pipe end can only be fully inserted in one of the two ends of a sleeve, otherwise the protrusions inside the wall of the sleeve do not fit the width of the retracted section of the front edge of the pipe end. This design helps ensure that the pipe ends are placed in the correct position in the sleeve when joining.

The exemplary designs of the detent are a sprung detent which is either cohesive with a pipe end and moves resiliently in the radial direction outwards to engage with a recess in the joint sleeve, or a sprung detent which is cohesive with the joint sleeve and moves resiliently inwards in the radial direction to engage with a recess in the pipe end, and these desings have particular advantages in that each of these designs allows a certain inaccuracy in production. This is achieved by allowing the recess to be a little wider in the circumferential direction than the detent itself. This also provides the possibility of engagement without the pipe ends being angularly positioned absolutely correctly in relation to the joint sleeve whilst joining the pipe end and joint sleeve.

Pins and detents which engage via a movement of the detent in the circumferential direction are of course possible, but from the point of view of design they are not all that easy to construct.

A further advantage of the flexible detent solution is that it can be designed so that engagement is marked by an audible click the moment the detent springs correctly back into engagement with the recess in the corresponding part.

In certain types of piping there may be a particular requirement for structures in consecutive pipe sections to be seated in a perfectly correct angular position, where one pipe section is not therefore rotated arbitrarily relative to a previous pipe section, to which it is joined by the system of the invention. For this purpose it is specified, that at least one of the angular sections has a width or angular extension which deviates from the other angular sections with the retracted front edge of the pipe end. This ensures that two consecutive pipe sections can only be joined at a unique angle of rotation about their longitudinal axis relative to each other and relative to the joint sleeve.

A system such as one having two pipe ends with each of their corresponding toothings formed at each end by identical pope sections, where the pipe sections are jointed end to end by the joint sleeve, wherein each pipe section also has one or more radial openings, and all of which have a fixed angular position relative to the toothing at the pipe ends so that the angular position of the radial openings remain unchanged across the joints of a number of pipe sections ensures that a number of such identical pipes can only be joined to the joint sleeve at the correct angle of rotation relative to each other, and this also means that other structures in each pipe, such as openings, will retain the same angular direction over a longer distance with a number of pipe sections. This can be highly advantageous when joining feed systems for small animals where a feeding station is installed at each opening and always in the same angular position relative to the opening.

The invention may also involve the use of such a system for joining pipe ends to establish a feed line for small animals in pens, such as chickens. The use of the system can ensure that long lines, with feed transfer and feed stations, can be established very easily and by fitters without any special training since the pipes can only be joined correctly by one method. At the same time there are major operational advantages of using the system for a feeding system, since it guarantees long durability and a high standard of hygiene for the feeding system.

In a further embodiment the invention also relates to a method for separable joining and fastening of two circularly cylindrical pipe ends with the same outside and inside diameters, in a mutually non-rotatable extension of each other with coinciding central axes. According to this embodiment of the invention, the pipe ends are placed axially against each other and are maintained radially, and a toothing in the axial direction at one pipe end engages with a corresponding toothing in the axial direction at the other pipe end in a final section of the axial assembly for joining two pipe ends. This method ensures, in particular, that the pipe ends are not rotatably linked to each other. Toothing at each of the two pipe ends also ensures that maximum torques can be transferred from one pipe to the next.

In an appropriate embodiment for this method, the pipe ends are inserted into a first part of the axial assembly individually in a common joint sleeve from each end and are maintained radially therein where there is contact and friction between the inner surface of the joint sleeve and the outer surface of the pipe ends. The joint sleeve is one of several possibilities of keeping the pipe ends joined in the axial and radial direction. Clips around the toothings or external clip devices at the pipe ends may produce a corresponding effect, but here there is a requirement for the toothings to seal tightly against one another, where a certain play in the toothing engagement is permissible with a joint sleeve.

It is preferable for the detent for each pipe end to be resiliently deformed during a first part of the insertion into the joint sleeve away from its U-deformed condition so that during the final part of the insertion it moves resiliently backwards and is accommodated in a recess in an opposing surface, so that the detents block the extraction of the pipe ends from the joint sleeve. This is a particularly appropriate method of keeping the pipes joined together in the joint sleeve. Screws inserted radially from the outside, such as setscrews in the joint sleeve, or other known joining methods, are possible but do not work without the use of tools.

The detent is deformed either by the front edge of a pipe end in the radial direction away from the pipe centre, and spring resiliently back into a recess in the outer surface of the pipe end, or is deformed by the front edge of the joint sleeve in the radial direction towards the pipe centre and springs resiliently back into a recess in the inner surface of the joint sleeve. The two possibilities are equally good viewed in this way, but in cases where the joint sleeve is of plastic and the pipes are of metal, it will also be much easier to design the detent as an integral part of the joint sleeve.

The invention also relates to a pipe section for use in the method for joining the pipe ends, the pipe section having at one end a toothing which is complementary in shape to a toothing at the other end, but the two toothings are mutually different to the extent that two consecutive identical pipes can only enter into a toothed engagement with each other if the ends face in such a direction that mutually different toothings meet, and if they are rotated to a unique radial angle about the longitudinal axis in which the shape-complementary engagement is possible. With such pipe sections it will be possible to join many pipe sections one after the other without any rotation of the position of the toothing between the first and last pipe section in the joined pipe.

It is further preferable for the toothings at the two pipe ends to have one, two or more radial angular sections in which the outermost edge of the pipe end is axially retracted, there being at least one radial section if there are two or more sections whose radial extension is different from the radial extension of that radial section or the other radial sections. This makes it possible to ensure that two consecutive pipe ends can only be joined in a single angular rotation about their common longitudinal axis relative to each other. Regardless of whether the pipes are kept together here by a joint sleeve or by other methods, the unique cutting of the radial sections can then guarantee moment-transmitting joining where the angular rotation of the pipes across many joints does not vary.

It is also preferable for the pipe section to have a wall thickness t and an inside diameter D, where the inside diameter D lies within the range 25 mm to 60 mm, preferably in the range 40 mm to 51 mm. These dimensions ensure that the pipe can easily be manufactured in thin-walled metal and is at the same time given light, stable piping which can be suspended in stalls and used as parts on an automatic feed system for small animals and poultry.

In a further embodiment, the invention also relates to a method to form such a pipe. According to this method the pipe from a rectangular plate which is bent and welded along a longitudinal welding seam, after which the toothing is formed by cutting away the radial sections at each end, and where any piercing in the pipe is also formed when pipe material is cut away. This method of forming a pipe promotes in particular the formation of a tube which is thin-walled, and where high torques could nevertheless be transmitted across a joint of two such pipes.

It is particularly appropriate to use laser machining to form thin-walled tubes, thus preventing the pipe from being exposed to substantial forces acting on the thin pipe wall during the formation of the highly complicated pipe ends. This is particularly important in connection with the toothings because they would otherwise be difficult to produce. If the toothing is formed in the pipe material whilst the pipe has not yet been bent up, but lies flat, there is easily the risk that the toothings may not be formed properly into circular cross-sections when the pipe is subsequently bent or rolled into a circular cross-section. It is therefore preferable for the toothings not to be formed until after the pipe has been bent up and welded along a longitudinal welding seam. In this case, the machining must be carried out without affecting the pipe too much, otherwise the toothings deform during machining. Laser machining or spark machining or water cutting are possible alternatives here, preference being given to laser machining because holes and cuts are also easily formed here further inside the pipe at a distance from both pipe ends, whilst maintaining good cutting speed.

BRIEF DESCRIPTION OF THE DRAWINGS

The invention will be explained in greater detail below with reference to the drawings, where.

DETAILED DESCRIPTION OF THE INVENTION

Figure 1:
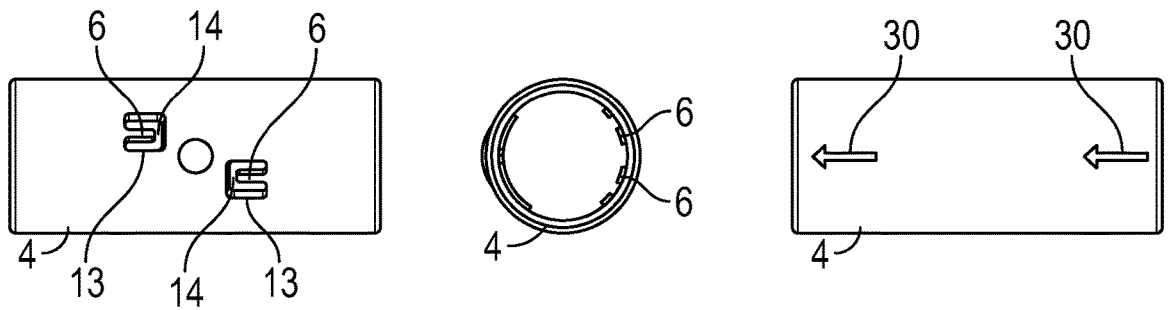
FIG. 1 shows the joint sleeve according to the invention in 3 projections.
Figure 4:
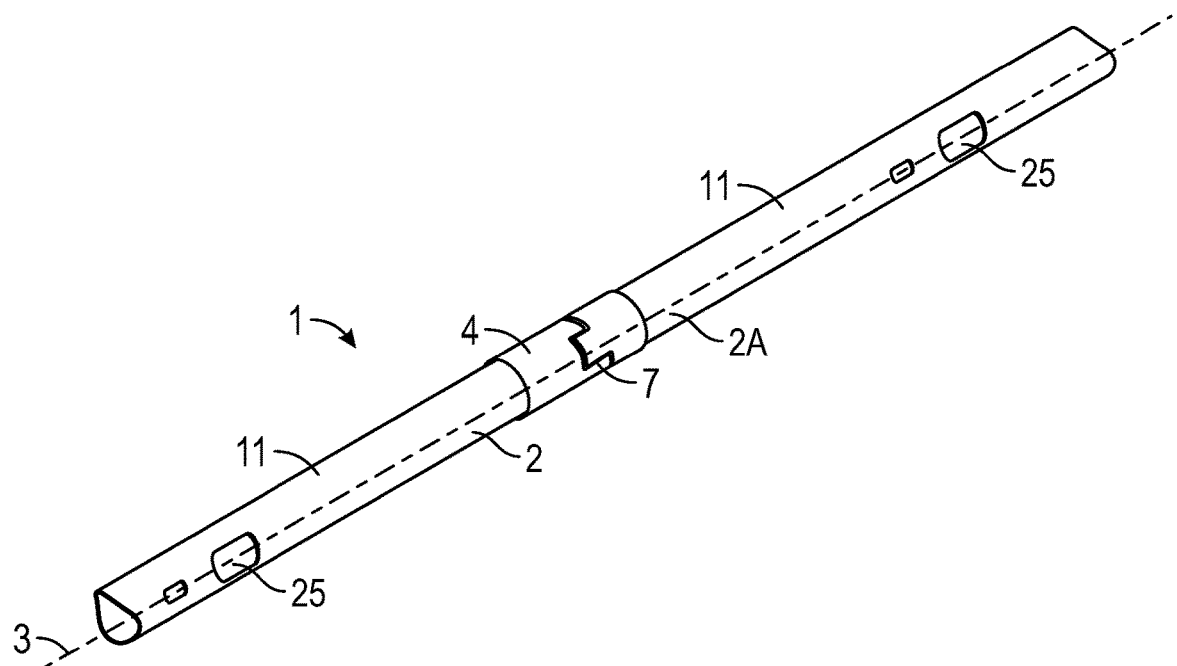
FIG. 4 shows a pipe joint according to the invention in which the joint sleeve is shown as transparent.
Figure 5:
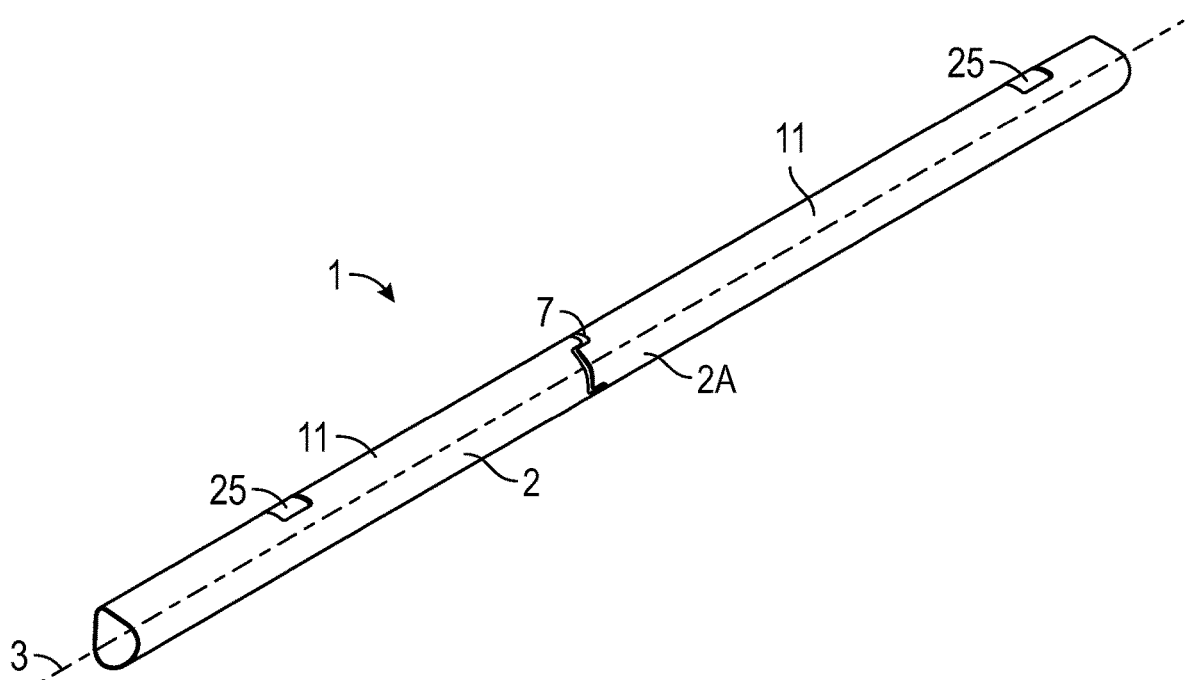
FIG. 5 is the pipe joint shown in FIG. 4, but without joint sleeve 4 and viewed from the opposite side.

In FIGS. 4 and 5, 1 denotes a system for joining two pipe ends 2 with the same outside diameters, in a mutually non-rotatable extension of each other with coinciding central axes 3. A pipe end 2 will typically be a part of each of its sealed identical pipe sections 11, so that there is another pipe end 2A at the opposite end of the pipe section.

Figure 8:
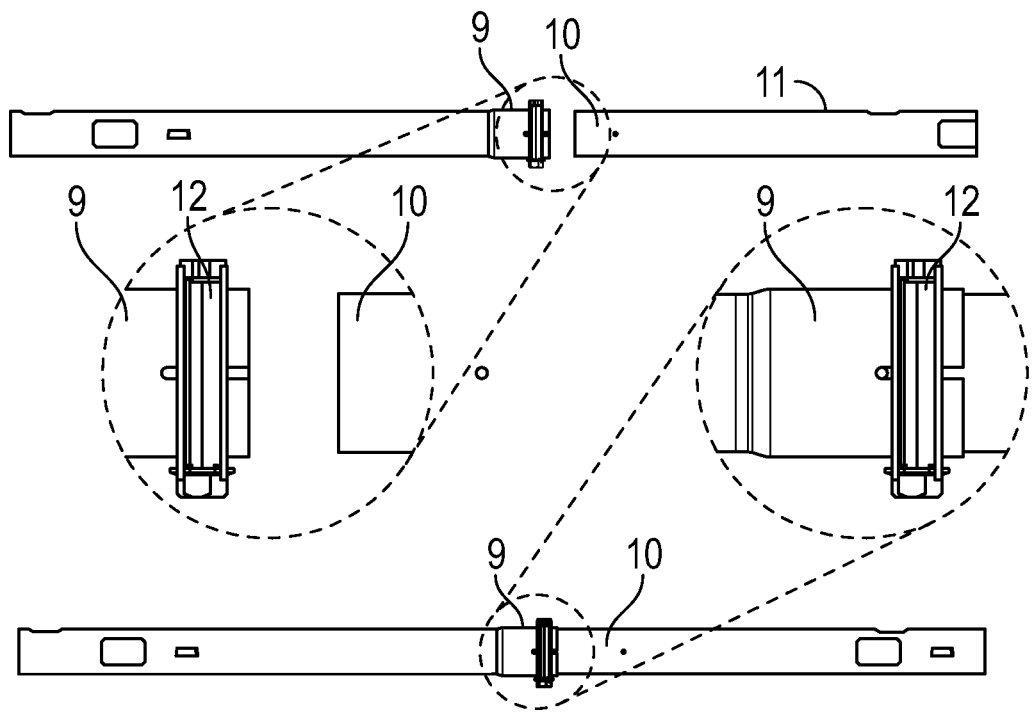
FIG. 8 is an example of a pipe joint according to the prior art.

In the systems of prior art for joining such pipe sections 11, one end will typically have a projection 9, so that on a shorter section connected to the end it has an inside diameter corresponding to the outside diameter of the remaining pipe section. Long pipes can then be formed by assembling pipes one after the other, where projection 9 always encloses the non projected end 10 of a subsequent pipe section 11. This is shown in FIG. 8. Here special precautions must then be taken if it is necessary to prevent mutual rotation between the individual pipe sections, and if the prevention of separation of the pipe ends is also required. FIG. 8 shows a clip 12 which is placed on the outside of projection 9 to prevent the pipes from being pulled out. The fitting of this clip requires the use of a tool and in a visual inspection it cannot be determined whether the clip is sufficiently secured. The use of a toll is then a precondition for establishing this pipe joint, and there is a risk of incorrect fitting.

According to the embodiment of the invention shown in FIG. 4, pipes 2, 2A are kept joined in a joint sleeve 4. Sleeve 4, which is shown in detail in FIG. 1-FIG. 3, has a cylindrical pipe section which has a pipe end fitted at each end (these are only shown in FIGS. 4 and 5), where movements in the radial direction between pipe ends 2, 2A are prevented by frictional engagement between joint sleeve 4 and each of the two pipe ends 2, 2A, and retraction of pipe ends 2, 2A from joint sleeve 4 is prevented by a sprung detent 6 for each of pipe ends 2, 2A. At the same time, mutual rotation about central axis 3 between the two pipe ends is prevented by engagement between toothings 7 in the axial direction at the two pipe ends 2, 2A.

Protection against movements in the radial direction between joint sleeve 4 and each of the two pipe ends 2, 2A is achieved in that there is a reasonable fit between the inside diameter of joint sleeve 4 and the outside diameters of ends 2, 2A on pipe sections 11. The fit may be a sliding or force fit, according to the requirement. A suitable choice of fit can ensure that pipe ends 2, 2A cannot displace their central axes relative to each other, nor can it rotate about axes perpendicular to the central axis. Within the limits provided by the fit chosen, joint sleeve 4 therefore keeps pipe ends 2, 2A in an extension of each other with coinciding central axes.

Retraction of the pipe ends from joint sleeve 4 is prevented by a sprung detent 6, which may either be cohesive with a pipe end 2, 2A and move resiliently in the radial direction outwards to engage with a recess 8 in joint sleeve 4 as illustrated by FIGS. 1A, 2A, 4A and 9A, or which may be cohesive with joint sleeve 4 and move resiliently in the radial direction inwards to engage with a recess 8 at pipe end 2, 2A. The last of the two possibilities mentioned is illustrated in FIGS. 3 and 4, and FIG. 3 shows two U-shaped recesses 13, each of which defines a sprung detent 6. As can be seen in the sectional drawings in the centre in FIGS. 1 and 2, the sprung detent 6 moves a short distance into joint sleeve 4 past its inside diameter. Since the joint sleeve is manufactured from a resilient, ductile material such as plastic or metal, detent 6, on the application of a force in the radially upward direction, yield resiliently and will be moved upwards until it no longer lies within the inside diameter of the joint sleeve. When the outermost end of a pipe section 2, 2A is pressed into joint sleeve 4 from either one or the other end, detent 6 will then be moved relatively unhindered radially outwards and will allow the front edge 5 of the pipe section (shown in FIG. 9) to move past it.

Figure 9:
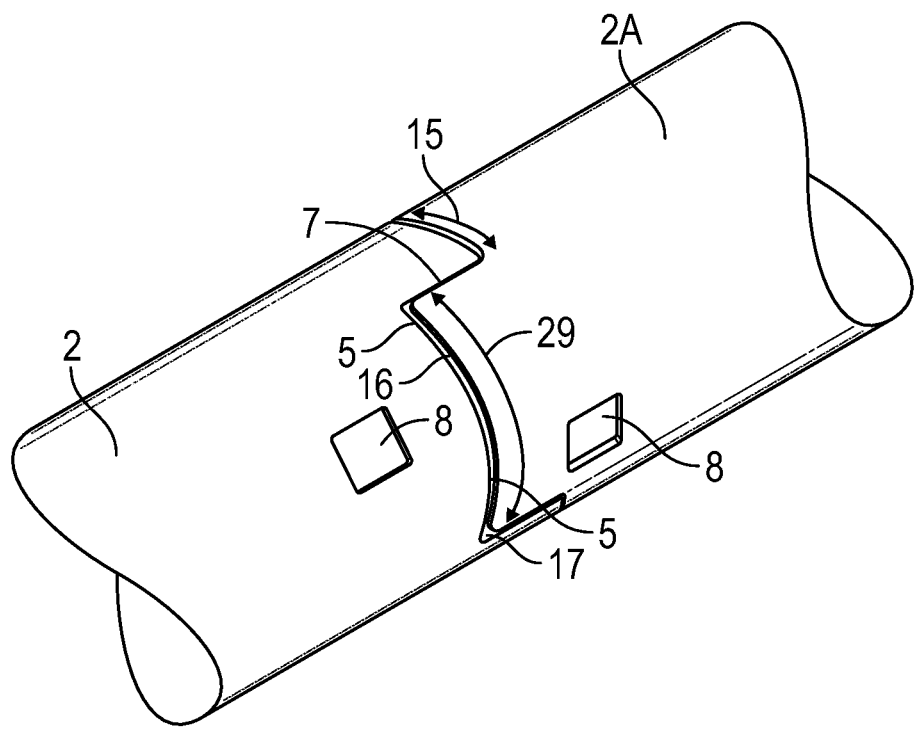
FIG. 9 is an enlarged section of the pipe joint shown in FIG. 4.

As shown in FIG. 9, there is in each pipe section 11 a recess 8 corresponding to detent 6, into which recess detent 6 is able to slide resiliently. This position of detent 6 is shown in FIG. 4, and recess 8 is shown in an enlarged section in FIG. 9. FIG. 4 shows joint sleeve 4 as being partially transparent so that recess 8 can be imagined at each of the pipe ends when they are inserted in joint sleeve 4. It should be noted that it is relatively simple to design sprung detent 6 in such a manner that when engagement is established with the recess it emits a clear signal, e.g. an acoustic signal or a vibration signal so that a fitter can either hear and/or feel that a correct engagement has been achieved. The design criterion for this is that the front edge of the recess and/or the detent are angled relative to each other so that when the front edge of the detent moves beyond the engaging edge of the recess the detent suddenly springs back, which can give rise to a distinctly audible "clicking" sound, clearly indicating to the fitter that a correct engagement has been achieved.

When a pipe end 2, 2A is secured in this way in a joint sleeve 4, the ends cannot be pulled out of joint sleeve 4 again because the front edge 14 of the detent will abut against the recess. However, detent 6 can be lifted with a screwdriver, for example, with a slotted head screwdriver or corresponding tool, which can be put down from the outside into the U-shaped recess 13 in front of the front edge 14 and tilt the detent outwards in the radial direction away from the pipe end. If recess 8 in pipe end 11 is continuous, there will be a connection from the inside of the pipe end and out to the surrounding areas via the U-shaped recess 13. This can be prevented, for example, by inserting a thin-walled material 20 in recess 13, e.g. formed during injection moulding of joint sleeve 4. FIG. 3, DETAIL B shows this most clearly, the thin-walled material 20 acting as the material which is also known in injection moulding technology as a "fin". This could also be achieved by 2-component injection moulding technology in which a flexible rubber-elastic material 24 is cast in for complete or partial filling of the U-shaped recess 13, which in this case will no longer define an opening transversely through the wall of joint sleeve 4. At the same time, an adequate rubber-elastic material 24 could not really prevent the movement of the sprung detent 6. Material 24 may be a silicone and other highly flexible synthetic or natural polymer.

Figure 2:
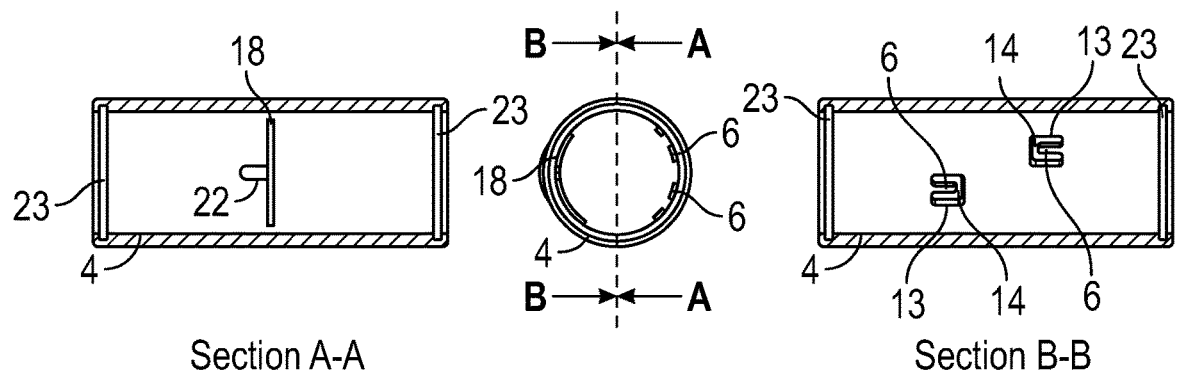
FIG. 2 shows the joint sleeve in FIG. 1 in a sectional drawing.
Figure 1A:
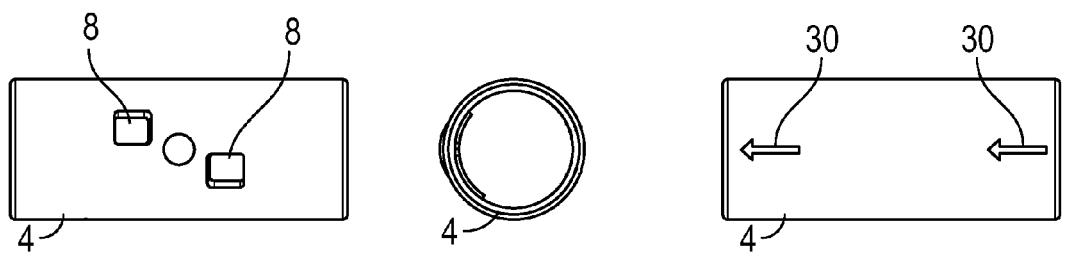
FIG. 1A shows the joint sleeve according to another exemplary aspect of the invention in 3 projections.
Figure 2A:
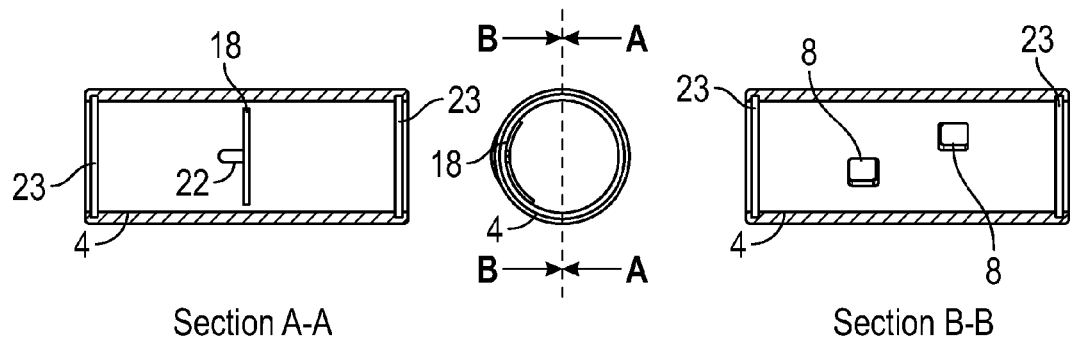
FIG. 2A shows the joint sleeve in FIG. 1A in a sectional drawing.
Figure 4A:
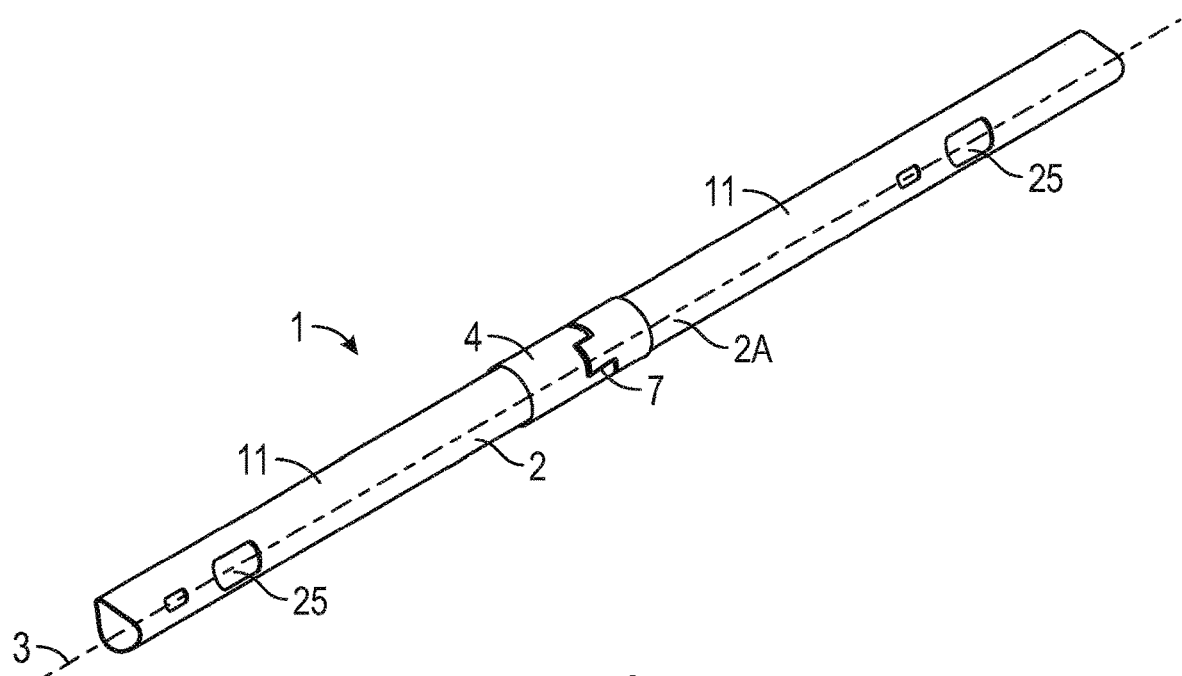
FIG. 4A shows a pipe joint according to the other exemplary aspect of the invention in which the joint sleeve is shown as transparent.
Figure 9A:
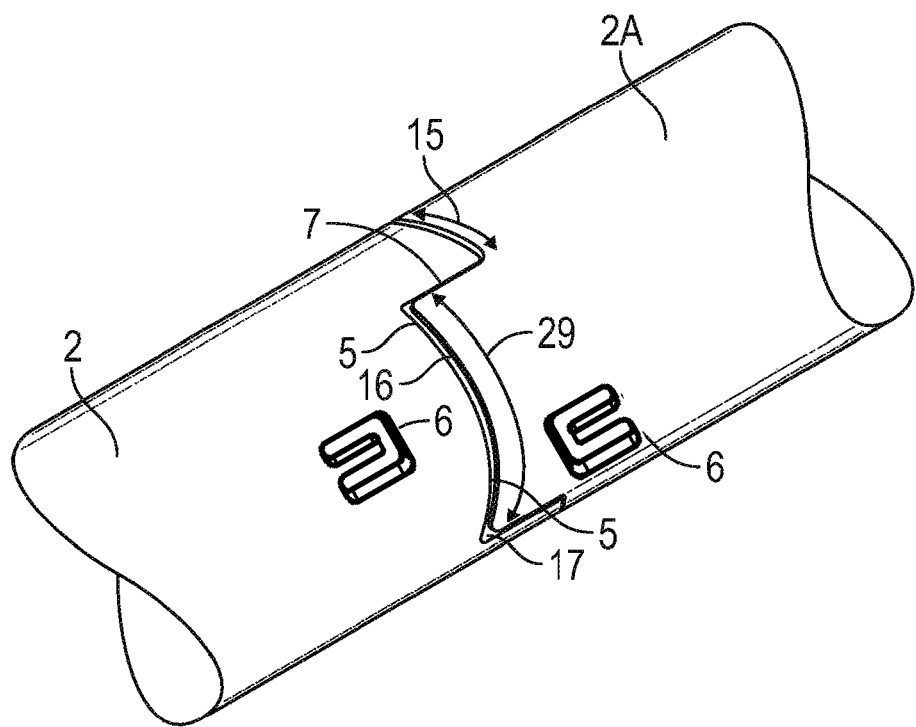
FIG. 9A is an enlarged section of the pipe joint shown in FIG. 4A.

Alternately, as shown in FIGS. 1A, 2A and 9A, there is in each pipe section 11 a sprung detent 6 corresponding to recess 8 in the joint sleeve 4, into which recess 8 the sprung detent 6 is able to slide resiliently. The sprung detent 6 is shown in an enlarged section in FIG. 9A. FIG. 4A shows joint sleeve 4 as being partially transparent so that sprung detent 6 can be imagined at each of the pipe ends when they are inserted in joint sleeve 4. It should be noted that it is relatively simple to design sprung detent 6 in such a manner that when engagement is established with the recess 8 it emits a clear signal, e.g. an acoustic signal or a vibration signal so that a fitter can either hear and/or feel that a correct engagement has been achieved. The design criterion for this is that the front edge of the recess 8 and/or the detent 6 are angled relative to each other so that when the front edge of the detent 6 moves beyond the engaging edge of the recess 8 the detent 6 suddenly springs back, which can give rise to a distinctly audible "clicking" sound, clearly indicating to the fitter that a correct engagement has been achieved.

As shown in FIG. 9, toothing 7 has in the axial direction, at each pipe end, referred to in the following as pipe end 2A, at least a radial angular section 15, which in the longitudinal direction is retracted from the front edge 16 of the pipe end.

This means that toothing 7 is formed from rectilinear extensions in the longitudinal direction of the pipe and extensions which follow a pipe circumference. The two pipe ends have shape-complementary toothings so that a projecting tooth 29, formed from two consecutive retracted angular sections in the circumferential direction, fit exactly into a retracted angular section of a corresponding pipe end. The two toothings 7 therefore engage with each other when the pipe ends are joined inside joint sleeve 4, thus ensuring that torques around the longitudinal direction of the pipe ends are transmitted from one pipe section to the next without affecting joint sleeve 4, and pipe ends 2, 2A are therefore joined so that they rotate in a U-shape relative to each other.

Figure 11:
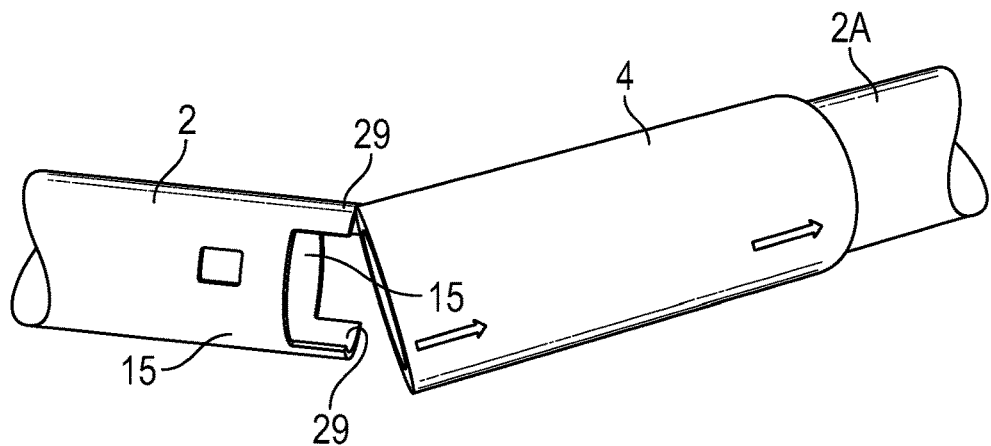
FIG. 11 is a photograph showing a pipe end ready to be inserted in a joint sleeve 4.

FIG. 11 shows the toothings of the pipe end alternating between projecting sections 29 which appear between the retracted parts 15 and it is also seen how all the angular sections are formed with extensions in the longitudinal direction and the circumferential direction.

In many cases, it is important for a well-defined angle of rotation to be established between the two pipe sections about their common longitudinal axis. This can be ensured by the fact that toothing 7 has at least one angular section which, in the circumferential direction, has an extension which differs from that or the other angular sections at the same pipe end. If there is only one angular section, the pipe ends can only be jointed in one unique position, but if there are several angular sections in the toothing, a geometric protection must be established to prevent the toothings of the pipe ends from engaging in several different positions. This is ensured by the angular section mentioned, which has an extension in the circumferential direction, which is different from the other projecting angular sections.

Figure 12:
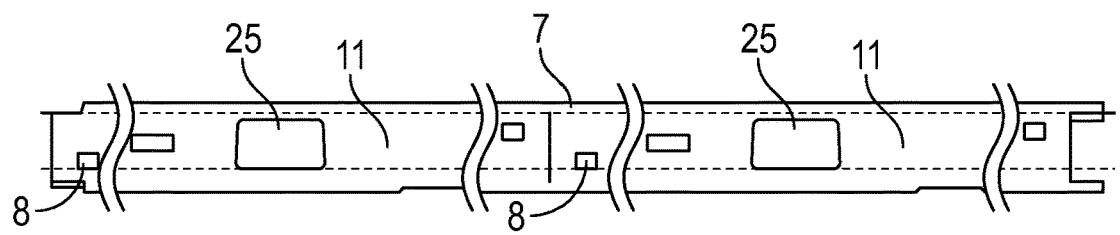
FIG. 12 shows two joint pipe sections 11 in an extension of each other, but without the joint sleeve.

Such protection against joining the pipe ends at differently rotated angles about their common longitudinal axis may be necessary, particularly if the system has structures in each pipe which are to maintain the same angular rotation about the longitudinal axis in the case of several consecutive joints of individual pipe sections. Here it is conceivable that the two pipe ends, each with their corresponding toothing, can be formed at each end by the same pipe section, e.g. produced in metal, the metal pipes being joined end to end by joint sleeve 4. As can be seen in FIG. 12, each metal pipe may then also have one or more radial openings 25, all of which have a fixed angular position relative to toothing 7 at the pipe ends. This is also seen in both FIG. 4 and FIG. 5 and it is evident from these figures that the angular position of the radial openings remains unchanged across joints of two identical pipes. FIG. 12 contains two longitudinal dotted lines, the top line following a longitudinal axis extension on toothing 7 and the bottom line following a cut 25. The figure shows that the cut is at the same angle of rotation to the joint in the pipe section to the left of the joint as in the pipe section to the right of the joint.

Figure 10:
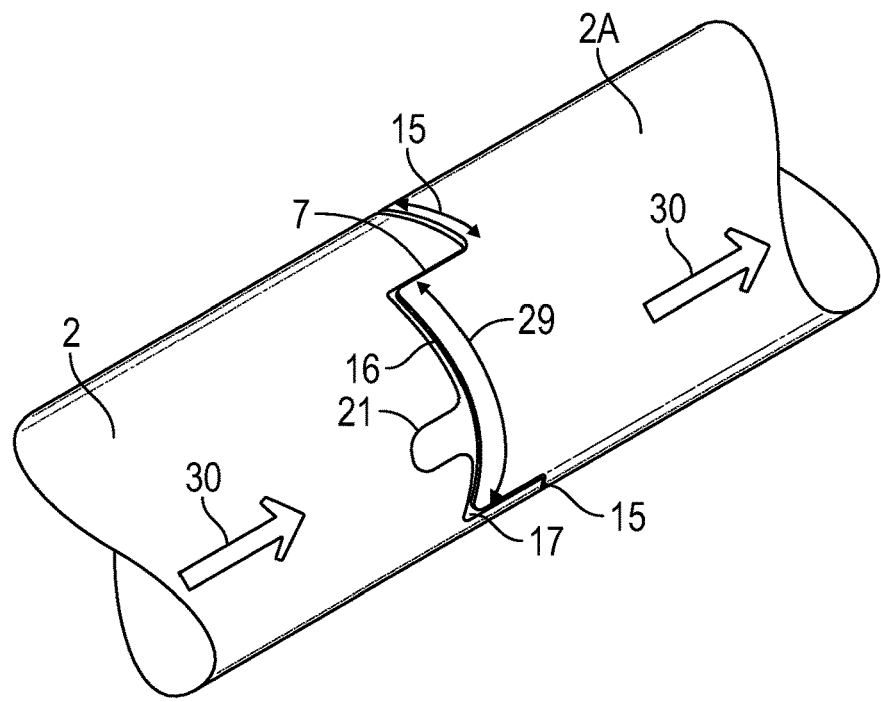
FIG. 10 is an enlarged section of the pipe joint shown in FIG. 5.

FIGS. 9 and 10 show that the retracted radial angular section of one of the pipe ends in the axial direction is longer in the axial direction than the retracted angular section of the other pipe end. This means when the two pipe ends 2 are joined in joint sleeve 4, at least one gap 17 is formed where pipe ends 2 are not in contact with each other. The tap or gaps 17 are completely or partially filled by a protrusion 18 inside joint sleeve 4 when pipe ends 2 are joined in it, protrusion 18 having the same inside diameter as the inside diameter at the two pipe ends. The shape-complementary toothings are therefore not fully shape-complementary in the longitudinal direction. On the contrary, the internal protrusion 18 in joint sleeve 4 means that a given pipe end can only be inserted correctly into joint sleeve 4 to engage with detent 6 from one and the same end of joint sleeve 4. As an alternative to a toothing with at least one radial angular section which is different for the other angular section(s) and the deviating length of the angular sections at the two pipe ends, it is proposed that in addition to at least one angular section, a positioning cut-out 21 be established in the pipe wall of one of the two pipe ends, and that a positioning protrusion 22 be established correspondingly inside joint sleeve 4. This ensures that only the pipe end which has position cut-out 21 in the correct position can be brought into engagement inside the pipe sleeve with positioning protrusion 22. At the same time, internal protrusion 22 in the joint sleeve with cut-out 21 at a pipe end will ensure correct engagement between the sprung detent and the recess for it.

Thus when a separable joint and fastening of two circularly cylindrical pipe ends with the same outside and inside diameters is to be established, in a mutually non-rotatable extension of each other and with coinciding central axes, pipe ends 2, 2A are inserted axially in a common central joint sleeve 4 from each end of joint sleeve 4. In the method for joining two pipe ends, no kind of tool is used. Joint sleeve 4 and the pipe ends can easily be provided with markings 30, which show a fitter the correct direction of insertion and correct mutual angular position at both the pipe end and the joint sleeve when the joint is to be established correctly so that no errors occur.

One of the applications in which a separable joint, such as that described here, is particularly useful, is for establishing a feed line for small animals in pens, such as chickens or hens.

Figure 6:
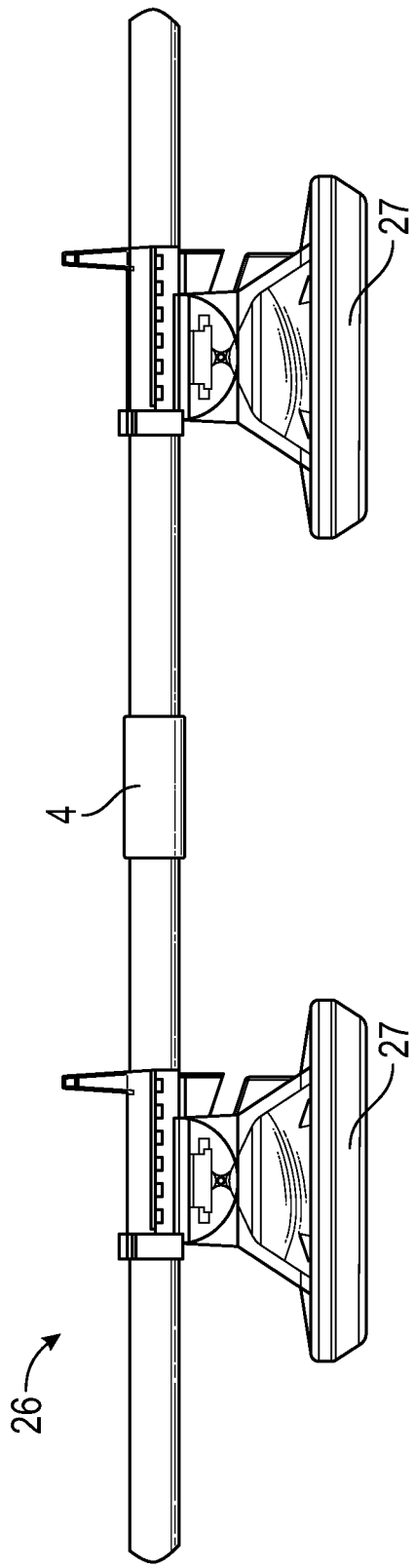
FIG. 6 shows a side view with two feed stations with a pipe joint between them on the same pipeline.
Figure 7:
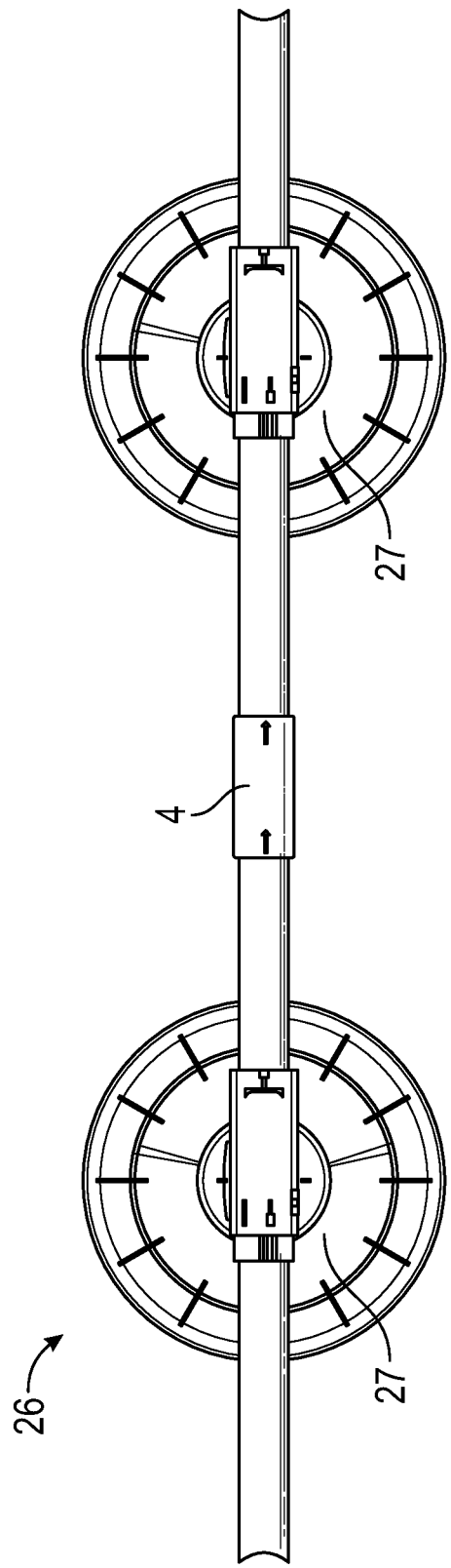
FIG. 7 is the feed line in FIG. 6 viewed from above.

As shown in FIGS. 6 and 7, feed line 26 may here have a number of pipes joined with joint sleeve 4. In one or more of the pipes, there is a feed unit 27 enabling feed to be transferred out of the pipe through a radial opening 25 therein. On the inside of feed line 26, there is a helical screw (not shown) which is rotated for transferring feed from an inlet end and on to feed unit 27. This type of feed unit is clearly described in EP1152658 B1. Stable joining with joint sleeve 4, as described, means that the entire pipe length can be rotated, thereby modifying the feeding or the position of the feed units so that they are facing towards a more cleaning-friendly position. Here the pipe will bear the total torque from the new feed units 27, now suspended laterally, for example (this position is not shown), the toothed engagement between the different pipe sections along the line serving this purpose in particular.

When the helical transfer screw is rotated inside the pipe, frictional forces will attempt to rotate the pipe with it, and this effect is accumulated along the entire length of the pipe. It is important that the pipes remain in their initial position for the transfer function and feed function. The toothing is therefore essential for maintaining the angle of rotation of each pipe. As described in EP1152658 B1, there are cases where the entire pipe system, with subsequent feed units, is required to be rotated about the central axis of the pipe, and here too individual joints between pipes may have to transmit torques without rotating the pipes relative to each other. The method indicated for joining the individual pipe sections 11 via pipe ends 2, 2A at each end thereof, with joint sleeves 4, ensures that the required torques between the pipes can be transmitted at the same time that radial forces and axial forces are absorbed by joint sleeve 4.

Figure 3:
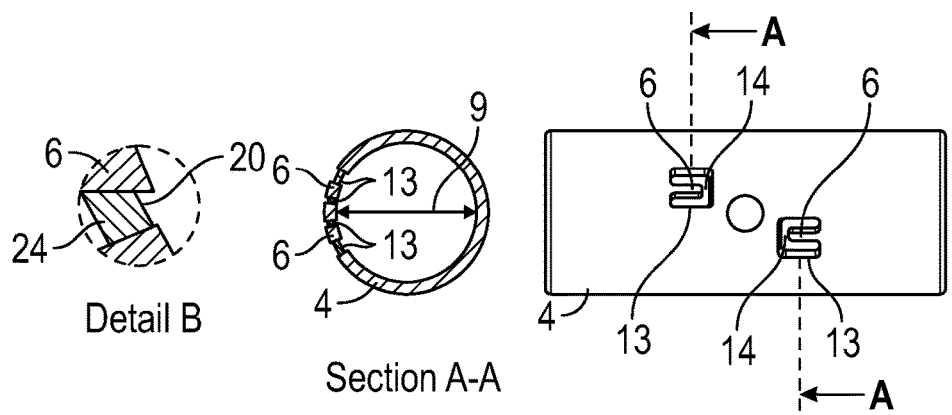
FIG. 3 shows the joint sleeve and a separate section, together with an enlarged section from the sectional drawing.

Joint sleeve 4 may be provided with an inner groove 23, as shown in FIG. 2, at each end. In it can be inserted an O ring (not shown) so that an actual packing is established between the outer surface of the pipe ends and the inner surface of the joint sleeve. The accumulation of water here, for example, could give rise to the growth of bacteria or fungi, which could contaminate either the feed in the pipe or the surrounding areas. The blocking of access between the inside of the piping, e.g. by a thin-walled material in the U-shaped recess to form the sprung detent and the O ring, help to ensure that the material inside the pipe cannot be exposed to contamination, not even during washing and any high pressure flushing of a feed system. Such contamination could have major financial consequences for a poultry farm, for example.

The ends of the pipes are best machined by laser machining, where the pipe wall itself is not subject to major force applications. This means that the pipes can be formed of relatively thin-walled material, such as material with wall thicknesses of between 0.5 mm and 3 mm. What is decisive here is that the pipe is initially formed from bent and welded plate material, and cuts are then formed at the ends and radial openings are formed at the predefined points. This is possible even with very thin-walled material because the pipe is not loaded mechanically during laser machining.

Pipe 11 typically has a wall thickness t and an inside diameter D. Inside diameter D lies within the range 25 mm to 60 mm, preferably within the range 40 mm to 51 mm. These dimensions provide a pipe which is particularly useful for feed systems in pens for small animals, such as poultry.

At several points in the figures, markings on both the pipes and joint sleeve are denoted by the reference number 30. Markings 30 are in the form of arrows, and they always indicate the direction from the inlet end of the feed line to the termination or from the termination to the inlet end. What is important here is that the arrows on both pipes and joint sleeves always point in the same direction in the same system. This helps the fitter who is to join the system to ensure that all the pipes are facing in the right direction. In each joining operation where a pipe end is to be inserted into the joint sleeve, there are always two possibilities for joining, in that the ends of one pipe or one joint sleeve can always be reversed, but it is only one possibility that is correct. The arrows help the fitter to turn the parts correctly from the start so that pipe ends which have already been inserted in a joint sleeve will not subsequently be pulled out again.

TERMS

1 System
2 Pipe end
3 Central axis
4 Joint sleeve
5 Front edge of the pipe section
6 Sprung detent I
7 Toothing
8 Recess
9 Projection
10 Unprojected end
11 Pipe section
12 Clip
13 U-shaped recess
14 Front edge of the detent
15 Radial angular section
16 Foremost edge
17 Gap
18 Protrusion
19 Inside diameter
20 Thin-walled material
21 Positioning cut-out
22 Positioning protrusion 23 Groove
24 Rubber-elasticmaterial
25 Radial openings
26 Feed line
27 Feed unit
28 Inlet end
29 Non-retracted radial angular sections or projecting teeth
30 Marking

The invention claimed is:

1. A system for joining two pipe ends having the same outside diameters and the same wall thicknesses in a mutually non-rotatable extension of each other with coinciding central axes, comprising:
    a joint sleeve having a cylindrical pipe section and configured for receipt and joining of each of the pipe ends, wherein movements in the radial direction are prevented by frictional engagement between the joint sleeve and each of the pipe ends;
    a sprung detent configured for deformation during the insertion of each pipe end and configured to prevent pulling out of the pipe ends from the joint sleeve; and
    toothings configured to prevent mutual rotation about the central axis of the pipe ends, wherein each of the toothings comprises at least one retracted radial angular section of each pipe end, which in the longitudinal direction is retracted from a foremost edge of each respective pipe end;
    wherein the retracted radial annular section of each pipe end receives a non-retracted radial angular section of the another pipe end when the toothings of the pipe ends engage in the joint sleeve;
    wherein the retracted radial angular section of one pipe end is longer in the axial direction than the retracted radial angular section of the other pipe end, so that when the pipe ends are engaged in the joint sleeve at least one gap is formed where the pipe ends are not in contact with each other; and
    wherein each of the at least one gaps is filed by a protrusion inside the joint sleeve when the pipe ends are joined therein, wherein the protrusion has the same inside diameter as the inside diameter of the two pipe ends.

2. The system for joining two pipe ends according to claim 1, wherein each pipe end is kept joined in the joint sleeve in the axial direction by engagement between the sprung detent and a recess, wherein the sprung detent is formed within at least one of the pipe ends and moves resiliently in the radial direction outwards to engage with the recess in the joint sleeve.

3. The system for joining two pipe ends according to claim 1, wherein each pipe end is kept joined in the joint sleeve in the axial direction by engagement between the sprung detent and a recess, wherein the sprung detent is formed within the joint sleeve and moves resiliently inwards in the radial direction to engage with the recess in the pipe end.

4. The system for joining two pipe ends according to claim 1, at least one retracted radial angular section has a width which differs from that of at least one other retracted radial angular sections, so that the toothing engagement is only possible with the two pipes at a unique angle of rotation about the longitudinal axis relative to each other and relative to the joint sleeve.

5. The system for joining two pipe ends according to claim 4, wherein the two pipe ends with each of their corresponding toothings are formed at each end by identical pipe sections, wherein the pipe sections are joined end to end by the joint sleeve, wherein each pipe section further comprises one or more radial openings, all of which have a fixed angular position relative to the toothings at the pipe ends so that the angular position of the radial openings remain unchanged across the joints of a number of pipe sections.

6. The use of the system according to claim 1 for establishing a feed line for small animals in pens, such as chickens, wherein the feed line has a number of pipe sections joined with joint sleeves, wherein at least one feed unit is formed by a radial opening in the pipe section, and wherein a helical screw is formed inside the feed line, which helical screw is rotated to transfer feed from an inlet end to the feed unit.

* * * * *